UNITED STATES PATENT OFFICE.

WILLIAM B. D. PENNIMAN, OF BALTIMORE, MARYLAND, ASSIGNOR, BY MESNE ASSIGNMENTS, TO WHITNEY YEAST CORPORATION, OF BOSTON, MASSACHUSETTS, A CORPORATION OF NEW YORK.

METHOD OF MAKING DRY YEAST.

1,386,360. Specification of Letters Patent. Patented Aug. 2, 1921.

No Drawing. Application filed March 6, 1918. Serial No. 220,802.

*To all whom it may concern:*

Be it known that I, WILLIAM B. D. PENNIMAN, a citizen of the United States of America, residing in the city of Baltimore, State of Maryland, have invented certain new and useful Improvements in Methods of Making Dry Yeast, of which the following is a specification.

This invention relates to a new and improved form of dry yeast and a method of producing the same. This application is the property of the assignee of the Whitney Patent No. 1,306,569, dated June 10th, 1919, the Whitney process having been developed conjointly with the one described in the present application. While the product is termed dry, it contains sufficient water to maintain the vitality of the yeast cells but not enough to support fermentation, that is, it is sufficiently dry not to deteriorate or putrefy at ordinary temperatures.

The object is to produce such a dry yeast which contains a high percentage of live yeast cells, which will retain a high degree of potency and may be kept without deterioration for a considerable period, as three months or more, and which when distributed and opened may still be kept a reasonable time till used.

In the manufacture of this product, I use a mixture of live yeast cells and starch or flour. This is dried in a vacuum, preferably at a temperature sufficiently low to permit but little fermentation, with the result that the yeast cells are rendered inactive or dormant and at the same time their vitality is preserved and they are ready to become active as soon as the water necessary to fermentation is supplied, the yeast being of course then subject to the requisite temperature.

In the practice of my process, I take live yeast cells, preferably free from adhering impurities from the mash tub and separated from the surplus liquid. To this material I add starch or flour or other filler which should be to the amount of one to four times the weight of the yeast cells, measured dry. These are preferably mixed at a low temperature as 50° to 60° F. In place of such mixture, a prepared compressed yeast may be used. This generally contains starch about equal in weight to the weight of the yeast cells if weighed dry. If starch is added to the cells taken from the mash, the mixture is first thoroughly stirred so as to make an intimate and uniform mixture of yeast cells and starch cells.

The material thus intimately mixed is next dried in a partial vacuum, the pressure being preferably less than one inch of mercury or the highest vacuum which can be conveniently obtained with a commercial pumping apparatus. Such a vacuum has no injurious effect on the yeast cells, the proportion of those in the culture which retain their vitality being as great as in the case of ordinary compressed yeast. The temperature may to the best advantage be maintained at about 50° to 60° Fahrenheit, *i. e.*, a temperature sufficiently low to check fermentation. If desired, a small quantity of soluble inorganic salts may be added to the material at the time of mixing. For this purpose ammonium phosphate, potassium nitrate, or magnesium phosphate may be used. These salts materially assist rapid revivification.

Drying is continued until the moisture is reduced to approximately a 10% content.

The product is a dry alcoholic yeast consisting of dry yeast cells of high vitality protected in some degree by the filler and salts used and containing an amount of water sufficient to maintain the yeast in a dormant condition. This yeast may be handled commercially in large quantities and kept in stock at all times by the retail dealers and the package may be opened by the purchaser and used without fear of deterioration within a reasonable period.

Having thus described my invention, what I claim and desire to secure by Letters Patent is:

1. In the art of making commercial dry yeast, the improvement which consists in mixing live yeast cells, starch and water, and subjecting the mixture to drying *in vacuo* at a temperature below that which is favorable to rapid fermentation.

2. In the art of making commercial dry yeast, the improvement which consists in mixing live yeast cells, separate from the mash, with a filler in powdered form, and water, and subjecting the mixture to drying *in vacuo* below that which is favorable to rapid fermentation, thus preserving the vitality of the cells and retarding their development.

3. In the art of making commercial dry yeast, the improvement which consists in mixing live yeast cells, starch cells and water and rendering the yeast cells inactive by subjecting the mixture to drying *in vacuo* at a temperature unfavorable to fermentation reducing the moisture content to about 10% of the whole and rendering the yeast cells inactive but preserving their vitality.

4. In the art of making commercial dry yeast, the improvement which consists in mixing live yeast cells, starch cells and water at a low temperature as 50° to 60° F., and rendering the yeast cells inactive by subjecting the mixture to drying *in vacuo* at a temperature unfavorable to fermentation.

5. In the art of making commercial dry yeast, the improvement which consists in mixing live yeast cells, separate from the mash, with a filler in powdered form, an inorganic salt and water, and subjecting the mixture to drying *in vacuo* at a low temperature as substantially 50 to 60°.

Signed by me at Baltimore, Maryland, this 1st day of March, 1918.

WILLIAM B. D. PENNIMAN.

Witnesses:
   ZELLA KUHN,
   ALICE G. DONEGAN.